US009401171B2

(12) United States Patent
Kasada et al.

(10) Patent No.: US 9,401,171 B2
(45) Date of Patent: Jul. 26, 2016

(54) MAGNETIC RECORDING MEDIUM AND METHOD OF MANUFACTURING THE SAME

(71) Applicant: FUJIFILM Corporation, Minato-ku, Tokyo (JP)

(72) Inventors: Norihito Kasada, Minami-ashigara (JP); Masahide Sato, Minami-ashigara (JP); Isamu Watanabe, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 13/838,996

(22) Filed: Mar. 15, 2013

(65) Prior Publication Data

US 2013/0260179 A1 Oct. 3, 2013

(30) Foreign Application Priority Data

Mar. 30, 2012 (JP) ................................ 2012-082117
Mar. 14, 2013 (JP) ................................ 2013-051354

(51) Int. Cl.

*G11B 5/706* (2006.01)
*G11B 5/708* (2006.01)
*G11B 5/842* (2006.01)
*G11B 5/70* (2006.01)

(52) U.S. Cl.

CPC ................ *G11B 5/7085* (2013.01); *G11B 5/70* (2013.01); *G11B 5/7013* (2013.01); *G11B 5/842* (2013.01)

(58) Field of Classification Search

None
See application file for complete search history.

(56) References Cited

U.S. PATENT DOCUMENTS 4,425,404 A * 1/1984 Suzuki et al. ................ 428/341
5,110,658 A * 5/1992 Nakano et al. ................ 428/141
5,750,233 A * 5/1998 Ogawa ............... G11B 5/70615 428/141
2004/0151946 A1* 8/2004 Kato et al. ................ 428/694 B
2007/0020490 A1* 1/2007 Harasawa ............ G11B 5/7085 428/842.8
2008/0297950 A1* 12/2008 Noguchi et al. .............. 360/313

FOREIGN PATENT DOCUMENTS

JP 64-087672 A 3/1989
JP 64-088914 A 4/1989
JP 4-170713 A 6/1992
JP 4-319516 A 11/1992
JP 8-045056 A 2/1996
JP 09035251 A * 2/1997
JP 2000-012315 A 1/2000
JP 2002367152 A * 12/2002 ............. G11B 5/738

OTHER PUBLICATIONS

English Machine Translation: Sasaki et al. (JP 2002-367152).*
English Translation (JP 09-035251).*

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium, which comprises a nonmagnetic layer containing a nonmagnetic powder and a binder and a magnetic layer containing a ferromagnetic powder and a binder in this order on a nonmagnetic support, wherein the nonmagnetic layer has a thickness of equal to or less than 300 nm; a composite elastic modulus as measured on a surface of the magnetic layer ranges from 6.0 to 8.0 GPa; the magnetic layer comprises an abrasive with a specific surface area by BET method ranging from 14 $m^2/g$ to 40 $m^2/g$; and a surface abrasive occupancy on a surface of the magnetic layer ranges from 0.2% to 2%.

11 Claims, No Drawings

MAGNETIC RECORDING MEDIUM AND METHOD OF MANUFACTURING THE SAME

CROSS-REFERENCE TO RELATED APPLICATIONS

This application claims the benefit of priority under 35 USC 119 to Japanese Patent Application No. 2012-082117 filed on Mar. 30, 2012 and Japanese Patent Application No. 2013-51354 filed on Mar. 14, 2013, which are expressly incorporated herein by reference in their entirety.

BACKGROUND OF THE INVENTION

1. Field of the Invention

The present invention relates to a magnetic recording medium and to a method of manufacturing the same. More particularly, the present invention relates to a high recording capacity magnetic recording medium affording both good electromagnetic characteristics and running stability, and to a method of manufacturing the same.

2. Discussion of the Background

Magnetic recording media in the form of particulate magnetic recording media having a magnetic layer fabricated by coating a magnetic coating material, comprising ferromagnetic powder and a binder dispersed in a solvent, on a nonmagnetic support, and metal thin-film type magnetic recording media, having ferromagnetic powder deposited in the form of a film on a nonmagnetic support, are known. Particulate magnetic recording media are known to be superior from the perspectives of productivity and general-purpose properties.

Various nonmagnetic particles are employed in particulate magnetic recording media as an abrasive in the nonmagnetic layer (see Japanese Unexamined Patent Publication (KOKAI) Heisei No. 8-45056, Japanese Unexamined Patent Publication (KOKAI) No. 2000-12315, Japanese Unexamined Patent Publication (KOKAI) Heisei No. 1-87672, Japanese Unexamined Patent Publication (KOKAI) Heisei No. 1-88914, Japanese Unexamined Patent Publication (KOKAI) Heisei No. 4-170713, and Japanese Unexamined Patent Publication (KOKAI) Heisei No. 4-319516, which are expressly incorporated herein by reference in their entirety.

In recent years, as the information being recorded has grown more diverse and increased in capacity, data backup tape products with high recording capacities have been brought to market. To achieve higher recording capacities, the magnetic layer has become increasingly thin. By contrast, in magnetic recording media sequentially comprised of a nonmagnetic support, a nonmagnetic layer, and a magnetic layer, the nonmagnetic layer has normally been formed of a comparatively thick film relative to the magnetic layer for ensuring calendaring moldability and the like. However, there are limits to the increase in capacity that can be achieved by reducing the thickness of the magnetic layer alone. Thus, when the present inventors attempted to reduce the thickness of the nonmagnetic layer in the design of a conventional magnetic recording medium, they encountered the phenomena of compromised electromagnetic characteristics and reduced running stability, making it difficult to obtain a magnetic recording medium of high reliability that permitted both recording and reproduction. One reason for this was that the status of protrusions from the surface of the magnetic layer in the form of abrasive contained in the magnetic layer differed from that of conventional magnetic recording media having thick nonmagnetic layers.

SUMMARY OF THE INVENTION

An aspect of the present invention provides for means of improving the electromagnetic characteristics and running stability of a magnetic recording medium having a thin nonmagnetic layer.

The present inventors conducted extensive research. As a result, they discovered that that by combining the means set forth below, it was possible to obtain a magnetic recording medium having a thin nonmagnetic layer that afforded good electromagnetic characteristics and running stability.

(1) In a magnetic recording medium having a thin nonmagnetic layer of equal to or less than 300 nm in thickness, forming the magnetic layer-side coating layers (including the magnetic layer and nonmagnetic layer) such that the composite elastic modulus falls within a range of 6.0 to 8.0 GPa.

(2) Using a microparticulate abrasive having a specific surface area by BET method that falls within a range of 14 to 40 $m^2/g$ as the magnetic layer abrasive.

(3) Controlling the presence of the above abrasive on the surface of the magnetic layer such that the surface abrasion occupancy on the surface of the magnetic layer falls within a range of 0.2 to 2%.

The process by which the present inventors discovered how to combine means (1) to (3) above will be described below.

It is conventionally considered desirable from the perspective of molding by calendering and the like for magnetic layer-side coated layers, particularly the nonmagnetic layer, to readily deform. However, the present inventors considered ready plastic deformation of the magnetic layer-side coating layers to be disadvantageous in terms of running stability. In that regard, one means of reducing plastic deformation is to reduce the thickness of the magnetic layer-side coating layers that undergo plastic deformation. This can be achieved by reducing the thickness of the nonmagnetic layer as set forth above. The present inventors changed the design of the magnetic layer and nonmagnetic layer so that the composite elastic modulus measured on the surface of the magnetic layer was diminished to reduce the energy causing plastic deformation in addition to reducing the portion undergoing plastic deformation by reducing the thickness of the nonmagnetic layer, thereby preparing a magnetic recording medium with magnetic layer-side coating layers undergoing reduced plastic deformation ((1) above).

However, when a magnetic layer-side coating layers designed differently from conventional magnetic recording media were formed as set forth above, various phenomena due to abrasive in the magnetic layer, such as head abrasion, scoring of the magnetic layer surface due to dropout of abrasive during drive running, and diminished electromagnetic characteristics attributed to these causes were still determined to present difficulties. Accordingly, the present inventors thought that it would be difficult to prevent the occurrence of the above phenomena without also changing the state of presence of the abrasive in the magnetic layer in corresponding fashion in a magnetic recording medium with diminished plastic deformation of the magnetic layer-side coating layers. As the result of extensive research, they discovered that by suitably incorporating microparticulate abrasive into the surface of the magnetic layer ((2) and (3) above), it was possible to improve the electromagnetic characteristics and running stability of a magnetic recording medium having a thin nonmagnetic layer.

An aspect of the present invention relates to:

a magnetic recording medium, which comprises a nonmagnetic layer containing a nonmagnetic powder and a binder and a magnetic layer containing a ferromagnetic powder and a binder in this order on a nonmagnetic support, wherein the nonmagnetic layer has a thickness of equal to or less than 300 nm;

a composite elastic modulus as measured on a surface of the magnetic layer ranges from 6.0 to 8.0 GPa;

the magnetic layer comprises an abrasive with a specific surface area by BET method ranging from 14 $m^2/g$ to 40 $m^2/g$; and a surface abrasive occupancy on a surface of the magnetic layer ranges from 0.2% to 2%.

In an embodiment, the abrasive is alumina.

In an embodiment, the magnetic layer further comprises an aromatic hydrocarbon compound having a phenolic hydroxyl group.

In an embodiment, the aromatic hydrocarbon compound having a phenolic hydroxyl group is a compound denoted by general formula (1):

(1)

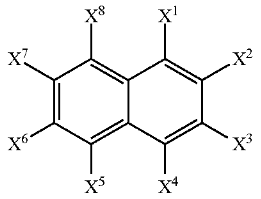

wherein, in general formula (1), two from among $X^1$ to $X^8$ denote hydroxyl groups and each of the remaining portions independently denotes a hydrogen atom or a substituent.

In an embodiment, the aromatic hydrocarbon compound having a phenolic hydroxyl group is selected from the group consisting of 2,3-dihydroxylnaphthalene and derivatives thereof.

In an embodiment, the magnetic layer further comprises a nonmagnetic particle other than the abrasive, and in a further embodiment, the nonmagnetic particle is a silica colloidal particle.

A further aspect of the present invention relates to:

a method of manufacturing a magnetic recording medium, which comprises:

preparing a coating material for forming a magnetic layer via a step of mixing an abrasive liquid with a magnetic liquid comprising a ferromagnetic powder, solvent, and a binder, wherein the abrasive liquid comprises an abrasive and a solvent, but essentially does not comprise a ferromagnetic powder; and forming a magnetic layer by coating the coating material for forming a magnetic layer that has been prepared on a nonmagnetic layer containing a nonmagnetic powder and a binder to provide the above magnetic recording medium.

In an embodiment the abrasive is alumina.

In an embodiment, the abrasive liquid further comprises an aromatic hydrocarbon compound having a phenolic hydroxyl group, in addition to the abrasive and the solvent.

In an embodiment, the aromatic hydrocarbon compound having a phenolic hydroxyl group is a compound denoted by general formula (1) set forth above.

In an embodiment, the aromatic hydrocarbon compound having a phenolic hydroxyl group is selected from the group consisting of 2,3-dihydroxylnaphthalene and derivatives thereof.

In an embodiment, the abrasive liquid comprises the aromatic hydrocarbon compound having a phenolic hydroxyl group in an amount ranging from 2 to 20 weight parts per 100 weight parts of the abrasive.

In an embodiment, the abrasive liquid further comprises a binder.

In an embodiment, the preparation of a coating material for forming a magnetic layer further comprises mixing a nonmagnetic liquid with the abrasive liquid and the magnetic liquid, and the nonmagnetic liquid comprises a nonmagnetic particle other than the abrasive and a solvent.

In an embodiment, the nonmagnetic particle is a silica colloidal particle.

The present invention can provide a high recording capacity magnetic recording medium having both good electromagnetic characteristics and running stability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a magnetic recording medium comprising a nonmagnetic layer containing a nonmagnetic powder and a binder and a magnetic layer containing a ferromagnetic powder and a binder in this order on a nonmagnetic support. In the above magnetic recording medium, the nonmagnetic layer has a thickness of equal to or less than 300 nm; a composite elastic modulus as measured on a surface of the magnetic layer ranges from 6.0 to 8.0 GPa; the magnetic layer comprises an abrasive with a specific surface area by BET method ranging from 14 $in^2/g$ to 40 $m^2/g$; and a surface abrasive occupancy on a surface of the magnetic layer ranges from 0.2% to 2%. The reasons for which both good electromagnetic characteristics and running stability can be achieved in the magnetic recording medium having a thin nonmagnetic layer of the above-stated film thickness are as set forth above.

The magnetic recording medium of an aspect of the present invention will be described in greater detail below.

The magnetic recording medium of an aspect of the present invention sequentially comprises, on a nonmagnetic support, a nonmagnetic layer equal to or less than 300 nm in thickness and a magnetic layer. As set forth above, combining the means of (1) to (3) above in an aspect of the present invention makes it possible to achieve both good electromagnetic characteristics and running stability in a magnetic recording medium having a thin nonmagnetic layer. However, while satisfying the requirements other than that relating to the thickness of the nonmagnetic layer, if the thickness of the nonmagnetic layer exceeds 300 nm, it becomes difficult to maintain running stability. This has been attributed to the fact that the portions undergoing plastic deformation increase. The thickness of the nonmagnetic layer is desirably equal to or more than 30 nm, preferably equal to or more than 50 nm from the perspective of forming a uniform coating layer.

From the perspective of achieving a high recording capacity, the magnetic layer positioned on the nonmagnetic layer is also desirably thin. From that perspective, the thickness of the magnetic layer is desirably equal to or less than 200 nm. From the perspective of forming a uniform coating layer, it is desirably equal to or more than 30 nm and preferably equal to or more than 50 nm in thickness. The thickness of the individual layers, such as the magnetic layer and nonmagnetic layer in the magnetic recording medium of an aspect of the present invention can be calculated from the coating conditions (the amount of coating liquid applied, the area of the coating, and the like). It can also be obtained by observing an ultrathin slice of the magnetic recording medium (for example, 10 μm in length) by a transmission electron microscope (TEM) at a magnification of 500,000×, for example.

In an aspect of the present invention, as a means of reducing plastic deformation of the magnetic layer-side coating layers, the thickness of the nonmagnetic layer is first kept to equal to or less than 300 nm as set forth above. In addition to the above, in an aspect of the present invention, the composite elastic modulus measured on the surface of the magnetic layer is kept to within a range of 6.0 to 8.0 GPa. That can reduce the plastic deformation of the magnetic layer-side coating layers (magnetic layer, nonmagnetic layer, and the like) and makes it possible to obtain a magnetic recording medium affording good running stability. In a state where the magnetic layer-side coating layers readily undergo plastic deformation, head contact becomes unstable, comprising running stability. By contrast, keeping the composite elastic modulus to equal to or greater than 6.0 GPa can achieve a stable state of sliding against the head, which is thought to contribute to enhancing running stability. However, when the composite elastic modulus becomes excessively high, deformation of the magnetic layer-side coating layers tends not to occur, conversely making it difficult to ensure running stability. Thus, the composite elastic modulus is set to equal to or less than 8.0 GPa.

In the present invention, the term "composite elastic modulus" refers to the composite elastic modulus that is evaluated using a Tribo Indenter made by Hysitron Inc. by using a spherical diamond indenter (tip R: 1.3 μm) to make a single pressing measurement of the magnetic layer surface (surface of coating layers on the magnetic layer side). The composite elastic modulus is obtained by the Hertz contact solution shown in equation 1 below.

$$P = \frac{4}{3}\sqrt{R}\,E_r h^{3/2} \qquad (1)$$

In the above equation, P denotes the pressing load, R denotes the radius of the spherical indenter, h denotes the pressing depth, and Er denotes the composite elastic modulus. The average value of three measurements at a pressing (unloading) time of 11 seconds up to the maximum pressing depth for a maximum pressing depth of 100 nm is adopted as the composite elastic modulus measured on the magnetic layer surface.

The composite elastic modulus measured on the surface of the magnetic layer can be controlled by the following methods, for example:

(A) Selection of the binders employed in the magnetic layer and nonmagnetic layer.

(B) Adjustment of the size and quantity of carbon black mixed into the magnetic layer and nonmagnetic layer.

(C) Adjustment of the mixing ratio of the binder and main powders (ferromagnetic powder and nonmagnetic powder) in the magnetic layer and nonmagnetic layer.

(D) Adjustment of the size of the ferromagnetic powder and nonmagnetic powder.

(E) Formation of an undercoating layer between the nonmagnetic layer and nonmagnetic support.

(F) Adjustment of the mechanical characteristics (such as the Young's modulus) of the nonmagnetic support.

As set forth above, the composite elastic modulus that is measured on the surface of the magnetic layer can be controlled in the magnetic layer and nonmagnetic layer. However, the magnetic layer, which determines the magnetic characteristics, is limited in terms of characteristics. Thus, control of the elastic modulus is desirably achieved primarily on the nonmagnetic layer side. Among (A) to (F) above, the impact of factors relating to voids in the nonmagnetic layer is high. Specifically, the size of the nonmagnetic powder in the nonmagnetic layer, the mixing ratio of nonmagnetic powder to binder, the types and quantities of polar groups of the binder in the nonmagnetic layer, and the size and mixing ratio of carbon black, and the like have major effects. When the average particle size of the nonmagnetic powder is about 5 to 50 nm, the voids in the nonmagnetic layer can decrease in number and size, thereby raising the elastic modulus. Both the size and quantity of carbon black added relate to voids. Generally, as the size of carbon black increases, it becomes easier to disperse, the number of voids in the nonmagnetic layer decreases, and the composite elastic modulus rises. The average particle diameter of the carbon black is desirably 10 to 50 nm, preferably 10 to 40 nm. Additionally, when little carbon black is added, it becomes easier to disperse, the number of voids in the nonmagnetic layer decreases, and the composite elastic modulus rises. It is also effective to employ known binders with high elastic moduli. When the binder that is contained in the nonmagnetic layer permits a high degree of dispersion of granular substance such as nonmagnetic powder and carbon black, the number of voids in the nonmagnetic layer can decrease and the composite elastic modulus can rise. Examples of binders that are desirable in this regard are those containing sulfonic acid (salt) groups (the concentration of sulfonic acid (salt) groups desirably being 0.04 to 0.5 meq/g). In the present invention, the term "sulfonic acid (salt)

group" is used to include the sulfonic acid group (—$SO_3H$) and sulfonate groups (such as —$SO_3Na$ and —$SO_3K$).

A radiation-cured layer formed by irradiating with radiation a radiation-curable composition containing a radiation-curable resin or radiation-curable compound is desirable as the undercoating layer of (E) above. The composite elastic modulus can be controlled by means of the thickness and formula of the radiation-cured layer.

By taking the above points into account and combining (A) to (F) as desired in the present invention, it is possible to keep to within the desired range the composite elastic modulus as measured on the magnetic layer surface.

In a magnetic recording medium having magnetic layer-side coating layers the plastic deformation of which has been reduced as set forth above, abrasive of the size that is employed in conventional magnetic recording media produces pronounced head abrasion due to an increased quantity protruding from the surface of the magnetic layer. Further, an increase in spacing variation due to a large amount of protruding abrasive ends up compromising electromagnetic characteristics and running stability. Further, the cushioning property of the magnetic layer-side coating layers in an aspect of the magnetic recording medium of the present invention is less than that in a magnetic recording medium of conventional design. Thus, abrasive tends to drop out of the magnetic layer surface during drive running. This tendency to drop out increases with the size of the abrasive particle. Thus, in magnetic recording media of reduced plastic deformation in the magnetic layer-side coating layers, it is also necessary to employ microparticles as abrasive to prevent dropping out of abrasive particles. From this perspective, a microparticulate abrasive having a specific surface area as measured by BET method ($S_{BET}$) of equal to or greater than 14 $m^2/g$ is employed as the magnetic layer abrasive in an aspect of the present invention. However, it is difficult to incorporate an ultramicroparticulate abrasive with an $S_{BET}$ exceeding 40 $m^2/g$ into the magnetic layer in a good state of dispersion. Thus, a coarse abrasive aggregate ends up protruding from the surface of the magnetic layer, causing head abrasion and compromising running stability and electromagnetic characteristics. Accordingly, a magnetic layer component with an $S_{BET}$ of 14 $m^2/g$ to 40 $m^2/g$ is employed in an aspect of the present invention.

Scorings from the medium surface, metal salts derived from lubricants, and the like adhere to the head and produce head grime during sliding of the reproduction head against the magnetic recording medium, compromising electromagnetic characteristics and running stability. The above abrasive can function to impart a cleaning property to the magnetic layer surface to remove such head grime. Its presence in suitable quantity on the surface of the magnetic layer can impart a good cleaning property. From the perspective of achieving a good cleaning property, it is desirable to employ an inorganic powder with a Mohs' hardness exceeding 8 as the abrasive and preferable to employ an inorganic powder with a Mohs' hardness of equal to or greater than 9. Diamond has the maximum Mohs' hardness of 10. Specific examples are alumina ($Al_2O_3$), silicon carbide, boron carbide ($B_4C$), TiC, cerium oxide, zirconium oxide ($ZrO_2$), and diamond powder. Of these, alumina is preferred. Alumina refers to a powder comprised chiefly of aluminum oxide. Alumina primarily comes in a crystalline form of an alpha form or a gamma form. Either can be used as the alumina in a particulate magnetic recording medium. The use of alumina with an alpha crystalline form (α-alumina), which has a high degree of hardness and can enhance the abrasive property and coating strength, is desirable. A rate of alpha conversion of equal to or greater than 50% in the α-alumina is desirable from the perspective of hardness. These aluminas can all be prepared by known methods and are available as commercial products. The above inorganic powder can be of any shape, such as acicular, spherical, or cubic. Shapes with angular portions are highly abrasive and thus preferred.

However, even employing the above microparticulate abrasive, head grime cannot be adequately removed when the quantity of abrasive present on the surface of the magnetic layer is inadequate. As a result, electromagnetic characteristics and running stability end up deteriorating. Additionally, when the quantity of abrasive present on the surface of the magnetic layer is excessive, head abrasion becomes pronounced, head scoring appears between the head and the surface of the medium, and thus electromagnetic characteristics and running stability tend to drop. Accordingly, in an aspect of the present invention, the surface abrasive occupancy on the surface of the magnetic layer is set to within a range of 0.2 to 2%. That can prevent head abrasion and a drop in electromagnetic characteristics and running stability while satisfying the various above-stated requirements. The surface abrasive occupancy on the surface of the magnetic layer in the present invention is defined as the value that is calculated as the ratio of the area occupied by abrasive to the total area when a secondary electron image taken at an image pickup magnification of 20,000 fold, an operating distance of 5 mm, and an acceleration voltage of 5 kV using a scanning electronic microscope (FE-SEM) is rendered binary using WinROOF made by Mitani Corp. as an image analyzer.

The surface abrasive occupancy on the surface of the magnetic layer can be controlled by means of the dispersion state of the abrasive in the magnetic layer. The higher the degree of dispersion, the lower the value tends to be. An example of a means of increasing the dispersion of the abrasive in the magnetic layer is the method of using a step of mixing a magnetic liquid containing a ferromagnetic powder, a solvent, and a binder with an abrasive liquid (essentially not comprising a ferromagnetic powder) containing an abrasive and a solvent to prepare a magnetic layer-forming coating liquid. Mixing the abrasive and the ferromagnetic powder once they have been separately dispersed can increase the dispersion of the abrasive in the magnetic layer-forming coating liquid. The "essentially not comprising a ferromagnetic powder" above means that it is not added as a structural component of the above abrasive liquid, and the presence of trace amounts of ferromagnetic powder as unintentionally contained impurities is permitted.

The abrasive employed as a magnetic layer component in the magnetic recording medium of an aspect of the present invention is comprised of microparticles as set forth above. To achieve a state of high dispersion of the microparticulate abrasive, it is effective to employ a dispersing agent. Among such agents, an aromatic hydrocarbon compound having a phenolic hydroxyl group is a dispersing agent that can maintain good dispersion and dispersion stability of microparticulate abrasive, particularly microparticulate alumina in a magnetic layer-forming coating liquid. The reason is not necessarily clear, but it is presumed that the aromatic hydrocarbon compound having a phenolic hydroxyl group can adsorb to the active points on the surface of the alumina, contributing to enhancing dispersion and dispersion stability. In this regard, when alumina is subjected to a dispersion treatment, the surface pH is known to constantly change. This has been attributed to alumina powder being comminuted by dispersion treatment, forming new active points on the surface thereof. When new active points adsorb together, alumina aggregation is promoted. However, when an aromatic hydrocarbon compound having a phenolic hydroxyl group adsorbs to these active points, aggregation can be inhibited. As a result, it is presumed that the alumina can then be stably dispersed to a high degree.

The term “phenolic hydroxyl group” refers to a hydroxyl group that is directly bonded to an aromatic ring. As regards the use of aromatic hydrocarbon compounds having phenolic hydroxyl groups in the preparation of a coating material for forming the magnetic layer of a particulate magnetic recording medium, Japanese Unexamined Patent Publication (KOKAI) Heisei No. 3-292617, which is expressly incorporated herein by reference in its entirety, proposes the use of dihydroxynaphthalene as a component capable of preventing the deterioration due to oxidation of ferromagnetic metal particles employed in magnetic recording. However, the fact that aromatic hydrocarbon compounds having phenolic hydroxyl groups, such as dihydroxynaphthalene, are components that contribute to enhancing the dispersion of alumina and its dispersion stability has not been realized before.

The aromatic ring contained in aromatic hydrocarbon compounds having phenolic hydroxyl groups can be of a monocyclic or polycyclic structure, or a fused ring. From the perspectives of enhancing the dispersion and dispersion stability of alumina, an aromatic hydrocarbon compound contained a benzene ring or naphthalene ring is desirable. The aromatic hydrocarbon compound can have substituents in addition to phenolic hydroxyl groups. From the perspective of availability of compound, examples of substituents in addition to the phenolic hydroxyl groups are halogen atoms, alkyl groups, alkoxyl groups, amino groups, acyl groups, nitro groups, nitroso groups, and hydroxyalkyl groups. In compounds having substituents other than phenolic hydroxyl groups, there is a tendency that compounds having electron-releasing substituents with a Hammett’s substituent constant of equal to or less than 0.4 are advantageous for the dispersion of alumina. In this regard, substituents with an electron-releasing property of equal to or greater than that of halogen atom, specifically, halogen atoms, alkyl groups, alkoxyl groups, amino groups, and hydroxyalkyl groups are preferred.

One, two, three, or more phenolic hydroxyl groups can be contained in the aromatic hydrocarbon compound. When the aromatic ring comprised by the aromatic hydrocarbon compound is a naphthalene ring, two or more phenolic hydroxyl groups are desirably contained, and two are preferably contained. That is, the compound denoted by general formula (1) below is desirable as an aromatic hydrocarbon compound comprising a naphthalene ring as an aromatic ring.

(1)

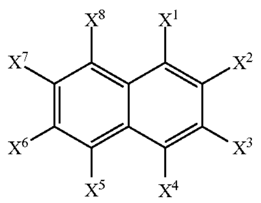

(In general formula (1), two from among $X^1$ to $X^8$ denote hydroxyl groups and each of the remaining portions independently denotes a hydrogen atom or a substituent.)

In the compound denoted by general formula (1), the substitution positions of the two hydroxyl groups (phenolic hydroxyl groups) are not specifically limited.

In the compound denoted by general formula (1), two from among $X^1$ to $X^8$ denote hydroxyl groups (phenolic hydroxyl groups), and each of the remaining portions independently denotes a hydrogen atom or a substituent. The portions other than the two hydroxyl groups among $X^1$ to $X^8$ can all be hydrogen atoms, or some portion thereof or all can denote substituents. Examples of substituents are the substituents given above. Phenolic hydroxyl groups can be included as the substituents in addition to the two hydroxyl groups. However, from the perspectives of dispersion and enhancing dispersion, they are desirably not phenolic hydroxyl groups. That is, the compound denoted by general formula (1) is desirably a dihydroxynaphthalene or a derivative thereof, among which 2,3-dihydroxynaphthalene or a derivative thereof is desirable. Examples of substituents that are desirable as the substituents denoted by $X^1$ to $X^8$ are selected from the group consisting of halogen atoms (such as chlorine atoms and bromine atoms), amino groups, alkyl groups with 1 to 6 (desirably 1 to 4) carbon atoms, methoxy groups, ethoxy groups, acyl groups, nitro groups, nitroso groups, and $—CH_2OH$ groups.

An aromatic hydrocarbon compound containing an aromatic ring in the form of a benzene ring desirably contains one or more phenolic hydroxyl groups, preferably one or two. General formula (2) denotes such an aromatic hydrocarbon compound.

(2)

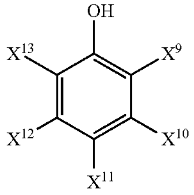

(In general formula (2), each of $X^9$ to $X^{13}$ independently denotes a hydrogen atom or a substituent.)

In general formula (2), $X^9$ to $X^{13}$ can all denote hydrogen atoms, or some portion thereof or all can denote substituents. Examples of substituents are the phenolic hydroxyl groups and substituents set forth above. Examples of desirable substituents are selected from the group consisting of hydroxyl groups, carboxyl groups, and alkyl groups having 1 to 6 (preferably 1 to 4) carbon atoms.

Specific desirable examples of the aromatic hydrocarbon compound denoted by general formula (2) are phenols, hydroxybenzoic acids, and derivatives thereof.

One of the above aromatic hydrocarbon compounds can be employed alone, or two or more can be employed in combination as dispersing agents. Each of these aromatic hydrocarbon compounds can be synthesized by known methods, and some are available as commercial products.

The solvent that is employed to prepare the abrasive liquid is not specifically limited. When the above dispersing agent is employed, it is desirable to employ one that dissolves the dispersing agent well. From this perspective, organic solvents are desirable. Among them, ketone solvents are preferred. From the perspective of being widely employed as solvents in particulate magnetic recording medium-forming coating liquids, ketone solvents are suitable solvents for preparing the abrasive liquid in an aspect of the present invention. Specific examples of ketone solvents are acetone, methyl ethyl ketone, methyl isobutyl ketone, and cyclohexanone. In addition to a ketone solvent, it is also possible to employ methanol, ethanol, isopropanol, toluene, xylene, ethyl benzene, ethyl formate, ethyl acetate, butyl acetate, dioxane, tetrahydrofuran, dimethyl formamide, and the like. The above dispersing agents are poorly soluble in water, so it is undesirable to employ just water as the solvent.

The abrasive liquid comprises an abrasive having the above stated $S_{BET}$, a solvent, and desirably, the above dispersing agent. It also desirably comprises a resin component that is capable of functioning as a binder in the particulate magnetic recording medium. That is because covering the surface of the abrasive with a resin component can further enhance the dispersion and dispersion stability of the abrasive. From this perspective, the use of a resin component with good adsorption to abrasive is desirable. A specific example is the use of a resin component having a functional group with polarity (a polar group) being adsorption points on abrasive. Examples of such polar groups are sulfo groups, phosphoric acid groups, hydroxy groups, carboxyl groups, and salts thereof. Sulfo groups with high adsorptive strength and their salts are desirable. To further enhance dispersion and dispersion stability, the quantity of polar groups in the resin component is desirably 50 to 400 meq/kg, preferably 60 to 330 meq/kg.

Various resins that are employed as binders in particulate magnetic recording media, such as polyurethane resins and vinyl chloride resins, can be employed as the resin component. Of these, from the perspective of the dispersion and dispersion stability of abrasive, the use of a polyurethane resin is desirable. Among the polyurethane resins, polyether polyurethane and polyester polyurethane resins are suitably employed. A polyurethane resin is a desirable resin component from the perspective of good solubility in ketone solvents, which are suitable solvents in an aspect of the present invention.

The abrasive liquid can be prepared by simultaneously or successively mixing and dispersing the above components. Glass beads can be used in dispersion. In addition to such glass beads, high specific gravity dispersion media in the form of zirconia beads, titania beads, steel beads, and alumina beads are suitable. These dispersion media are employed by optimizing the particle size and fill rate thereof. A known dispersion device can be employed. When employed, the above dispersing agent is desirably employed in a proportion of 2 to 20 weight parts, the solvent in a proportion of 150 to 970 weight parts, and the resin component in a proportion of 5 to 30 weight parts per 100 weight parts of abrasive to enhance dispersion and the dispersion stability of the abrasive and control the surface abrasive occupancy on the magnetic layer surface to within the above-stated range.

The magnetic layer-forming coating liquid of an aspect of the magnetic recording medium of the present invention is desirably prepared by mixing the abrasive liquid described above with a magnetic liquid containing a ferromagnetic powder, a solvent, and a binder. The magnetic liquid with which the abrasive liquid is mixed contains at least a ferromagnetic powder, solvent, and binder, and can contain as needed additives that are known to be commonly used in particulate magnetic recording media. Examples of ferromagnetic powders are acicular ferromagnetic powders, platelike magnetic powders, and spherical or elliptical magnetic powders. From the perspective of high-density recording, the average major axis length of an acicular magnetic powder is desirably equal to or more than 20 nm and equal to or less than 50 nm, preferably equal to or more than 20 nm and equal to or less than 45 nm. The average plate diameter of a platelike magnetic powder is desirably equal to or more than 10 nm and equal to or less than 50 nm as a hexagonal plate diameter. When reproduction is conducted with a magnetoresistive head, noise should be kept low and the plate diameter is desirably equal to or less than 40 nm. The plate diameter is desirably kept within the stated range to eliminate thermal fluctuation and achieve stable magnetization. Due to low noise, the stated range is suited to high-density magnetic recording. From the perspective of high-density recording, a spherical or elliptical magnetic powder desirably has an average diameter of equal to or greater than 10 nm and equal to or less than 50 nm.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798, which is expressly incorporated herein by reference in its entirety, for the details of the above-described magnetic powders.

Examples of additives employed in the manufacturing of the magnetic layer coating material are lubricants, dispersing agents, dispersion adjuvants, antifungal agents, antistatic agents, oxidation-inhibiting agents, carbon black, and solvents. For specific details of these additives, for example, reference can be made to paragraphs [0111] to and [0117] to [0121] in Japanese Unexamined Patent Publication (KOKAI) No. 2009-96798. A curing agent can be employed to increase the coating strength of the magnetic layer in preparing the coating material for forming a magnetic layer. For details of curing agents that can be employed reference can be made to paragraphs [0093] and [0094] of Japanese Unexamined Patent Publication (KOKAI) No. 2009-96798. The curing agent can be added during preparation of the magnetic liquid, simultaneously with mixing of the magnetic liquid and the abrasive liquid, or subsequently to the mixture that has been prepared.

The solid component concentration of the magnetic liquid is desirably about 10 to 50 weight percent from the perspective of dispersion of particulate substances (ferromagnetic powder and the like) in the magnetic liquid and ease of preparing the magnetic liquid. Examples of the binder employed in preparing the magnetic liquid and the binder employed in preparing the nonmagnetic layer-forming coating liquid are conventionally known thermoplastic resins, thermosetting resins, reactive resins, and combinations thereof. For details, reference can be made to paragraphs [0044] to [0049] in Japanese Unexamined Patent Publication (KOKAI) No. 2009-54270, which is expressly incorporated herein by reference in its entirety, for example. As set forth above, the composite elastic modulus measured on the surface of the magnetic layer can be controlled through the type of binder employed. The quantity of binder that is added is desirably 5 to 30 weight parts per 100 weight parts of ferromagnetic powder for the magnetic layer and 10 to 20 weight parts per 100 weight parts of nonmagnetic powder for the nonmagnetic layer. As set forth above, a curing agent such as a polyisocyanate compound can be employed with the binder in the magnetic layer-forming coating liquid. The same applies to the nonmagnetic layer-forming coating liquid. The quantity of curing agent employed can be suitably determined.

The magnetic liquid can be prepared by mixing the above components in a known stirrer or dispersing apparatus such as a disperser or sand mill. The magnetic liquid that has been prepared can be mixed with the abrasive liquid set forth above. Taking into account the abrasiveness and fill rate of the ferromagnetic powder in the magnetic layer that is formed, the magnetic liquid and abrasive liquid are desirably mixed in a proportion of 1 to 20 weight parts of abrasive per 100 weight parts of ferromagnetic powder. From the perspective of the dispersion and dispersion stability of the abrasive in the coating material for forming the magnetic layer, the magnetic liquid and abrasive liquid are desirably mixed in proportions yielding 2,300 to 120,000 weight parts of solvent per 100 weight parts of abrasive. Either simultaneously or after mixing of the magnetic liquid and the abrasive liquid, the above-described additives, curing agent, and other optional components can be added. After mixing the magnetic liquid and the abrasive liquid, it is possible to use ultrasonic dispersion, sand mill dispersion, or the like to obtain a coating material for forming a magnetic layer in which granular substances including abrasive and ferromagnetic powder have been dispersed to a high degree.

The magnetic recording medium of an aspect of the present invention can contain nonmagnetic particles that are different from the abrasive in the magnetic layer. Such nonmagnetic particles can be a component that contributes to maintaining running durability by enhancing the friction characteristic (lowering the coefficient of friction) on the surface of the magnetic layer. To achieve a good effect, it is desirable for the Mohs' hardness to be lower than that of the abrasive and for the nonmagnetic particles employed to be larger in size than that of the abrasive. The average particle diameter of the nonmagnetic particles is desirably 50 to 200 nm. In the present invention, the average particle diameter of the nonmagnetic particles is a value determined by the method described in paragraph [0015] of Japanese Unexamined Patent Publication (KOKAI) No. 2011-48878, which is expressly incorporated herein by reference in its entirety. Of these, from the perspective of dispersion, colloidal particles are desirably employed and inorganic oxide colloidal particles are preferably employed. For details, reference can be made to paragraph [0023] in Japanese Unexamined Patent Publication (KOKAI) No. 2011-48878. It is particularly desirable to employ nonmagnetic particles in the form of silica colloidal particles (colloidal silica) from the perspective of the ready availability of monodisperse colloidal particles.

The content of nonmagnetic particles in the magnetic layer is not specifically limited so long as it is set within a range that permits achieving both electromagnetic characteristics and friction characteristics. 0.5 to 5 weight parts per 100 weight parts of ferromagnetic powder are desirable and 1 to 3 weight parts are preferred.

The nonmagnetic particles can be added to at least one from among the magnetic liquid or abrasive liquid. From the perspective of forming a magnetic layer in which the abrasive, ferromagnetic powder, and nonmagnetic particles are all well dispersed, it is desirable to separately prepare a nonmagnetic liquid containing the nonmagnetic particles from the magnetic liquid and abrasive liquid, and to mix it with the abrasive liquid and magnetic liquid. In preparing such a nonmagnetic liquid, reference can be made to paragraphs [0022] and [0024] to [0027] of Japanese Unexamined Patent Publication (KOKAI) No. 2011-48878.

The magnetic recording medium of an aspect the present invention comprises a nonmagnetic layer containing a nonmagnetic powder and a binder between a nonmagnetic support and a magnetic layer. For details regarding the nonmagnetic powder employed in the nonmagnetic layer, reference can be made to paragraph [0046] of Japanese Unexamined Patent Publication (KOKAI) No. 2011-48878. The average particle size of the nonmagnetic powder desirably falls within a range of 5 to 50 nm, as set forth above. The specific surface area of the nonmagnetic powder is desirably 1 to 100 $m^2/g$, preferably 5 to 80 $m^2/g$, and more preferably, 10 to 75 $m^2/g$. Known additives can be employed in the nonmagnetic layer.

Binder resins, lubricants, dispersing agents, and other additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Further, carbon black can be incorporated into the nonmagnetic layer of an aspect of the magnetic recording medium of the present invention. The details thereof are as set forth above.

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. As set forth above, with regard to the surface roughness of the nonmagnetic support that can be employed in an aspect the present invention, a center average roughness Ra at a cutoff value of 0.25 mm desirably ranges from 3 to 10 nm. Further, as set forth above, the composite elastic modulus measured on the surface of the magnetic layer can be controlled by means of the mechanical characteristics of the nonmagnetic support.

The magnetic recording medium of an aspect of the present invention can comprise one or more optional layers that can be formed in the particulate magnetic recording medium, such as a backcoat layer, in addition to the above layers. As set forth above, forming a radiation-cured layer makes it possible to control the composite elastic modulus measured on the surface of the magnetic layer to within the desired range.

The thickness of the nonmagnetic support in the magnetic recording medium of an aspect of the present invention is desirably 3 to 10 μm. The thickness of the backcoat layer is, for example, 0.1 to 1.0 μm, desirably 0.2 to 0.8 μm.

The thicknesses of the magnetic layer and the nonmagnetic layer in an aspect of the present invention are as set forth above. The nonmagnetic layer is effective so long as it is substantially nonmagnetic. For example, it can exhibit the effect of an aspect of the present invention even when it comprises impurities or trace amounts of magnetic material that have been intentionally incorporated, and can be viewed as substantially having the same configuration as the magnetic recording medium of an aspect of the present invention. The term "substantially nonmagnetic" is used to mean having a residual magnetic flux density in the nonmagnetic layer of equal to or less than 10 mT (100 G), or a coercive force of equal to or less than 7.96 kA/m (100 Oe), it being preferable not to have a residual magnetic flux density or coercive force at all.

Reference can be made to paragraphs [0055] and [0056] of Japanese Unexamined Patent Publication (KOKAI) No. 2011-48878 for preparation of the coating liquids for forming the various layers such as the magnetic layer and nonmagnetic layer. Preparation of the abrasive liquid, magnetic liquid, and the like in the preparation of the magnetic layer-forming coating liquid is as set forth above.

The coating machine used to apply the coating liquids for the magnetic layer, nonmagnetic layer, and backcoat layer can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which is expressly incorporated herein by reference in its entirety, for these coating machines. Following the coating step, the medium can be subjected to various post-processing, such as processing to orient the magnetic layer, processing to smoothen the surface (calendering), and thermoprocessing. Post-processing can be conducted by known methods. The calendering pressure, for example, is 200 to 500 kN/m, desirably 250 to 350 kN/m. The calendering temperature is, for example, 70 to 120° C., desirably 80 to 100° C. And the calendering rate is, for example, 50 to 300 m/min, desirably 100 to 200 m/min. The coating layers on the magnetic layer side in the magnetic recording medium of an aspect of the present invention can undergo less plastic deformation than in conventional media, and thus little shape change can be achieved by calendering. However, suitable means (for example, use of a smooth nonmagnetic support and formation of the undercoating layer) can be adopted to compensate calendaring to reduce the waviness of the surface of the magnetic layer, thereby yielding a magnetic recording medium with low spacing variation despite little change in the shape achieved by calendering the coating layers on the magnetic layer side.

Normally, the tape-shaped magnetic recording medium (magnetic tape) is subjected to a heat treatment to improve dimensional stability in the use environment, promote curing of the magnetic layer, backcoat layer, and the like to which a thermosetting curing agent has been added, and the like. The temperature of such heat treatment is desirably suitably adjusted based on the objective, and can fall within a range of 50 to 80° C., for example. To enhance productivity, the heat treatment is desirably conducted after winding the product into a roll shape on a core-shaped member, or with the magnetic tape, prior to being cut into tape form, being wound into a roll form on a core-shaped member. The above calendering can be conducted before or after heat treating the magnetic tape, or both before and after the heat treatment. Conventionally, when the heat treatment is conducted in a roll form as set forth above, there is a pronounced tendency for back transfer, that is a depression causing dropout and caused by remaining shape change due to transfer of protrusions on the opposite surface (the surface of support or backcoat layer) to the surface of the magnetic layer, to occur. However, in an aspect of the present invention as set forth above, plastic deformation of the coating layers on the magnetic layer side can be reduced. Thus, even when subjected to heat treatment in a roll form, a magnetic tape can be obtained with little back transfer and little dropout.

The magnetic tape obtained can be cut to desired size with a cutter, punch, or the like for use.

The magnetic recording medium of an aspect of the present invention as set forth above can achieve a high recording capacity by reducing the thickness of the nonmagnetic layer and can exhibit good electromagnetic characteristics and running stability. Thus, it is suitable as a high-capacity data backup tape that can be used with high reliability for extended periods.

A further aspect of the present invention relates to a method of manufacturing the above magnetic recording medium of an aspect of the present invention. The method of manufacturing the above magnetic recording medium of an aspect of the present invention comprises preparing a coating material for forming a magnetic layer via a step of mixing an abrasive liquid with a magnetic liquid comprising a ferromagnetic powder, solvent, and a binder, wherein the abrasive liquid comprises an abrasive and a solvent, but essentially does not comprise a ferromagnetic powder; and forming a magnetic layer by coating the coating material for forming a magnetic layer that has been prepared on a nonmagnetic layer containing a nonmagnetic powder and a binder to provide the above magnetic recording medium. The details are as set forth above.

EXAMPLES

The present invention will be described in detail below based on Examples. However, the present invention is not limited to Examples. The terms "parts" and "percent" given in Examples are weight parts and weight percent unless otherwise stated.

Example 1

1. Preparing an Alumina Dispersion

To 100 weight parts of an alumina powder with an alpha conversion rate of 65% and a specific surface area by BET method of 30 $m^2/g$ (HIT-70, made by Sumitomo Chemical Co., Ltd.) were admixed 3 weight parts of 2,3-dihydroxynaphthalene (made by Tokyo Chemical Industry Co., Ltd.), 31.3 weight parts of a 32% solution (the solvent being a mixed solvent of methyl ethyl ketone and toluene) of polyester polyurethane resin having polar groups in the form of $SO_3Na$ groups (UR-4800 made by Toyobo (polar group quantity: 80 meq/kg)), and 570 parts of solvent in the form of methyl ethyl ketone and cyclohexanone 1:1 (w/w). In the presence of zirconia beads, the mixture was dispersed for 5 hours in a paint shaker. Following dispersion, the dispersion was separated from the beads with a mesh, yielding an alumina dispersion.

2. Formula of Magnetic Layer Coating Liquid

| | |
|---|---|
| (Magnetic liquid) | |
| Barium ferrite (average particle diameter 20 nm) | 100 parts |
| $SO_3Na$ group-containing polyurethane resin (molecular weight: 70,000; $SO_3Na$ groups: 0.2 meq/g) | 14 parts |
| Cyclohexanone | 150 parts |
| Methyl ethyl ketone | 150 parts |
| (Abrasive liquid) | |
| Alumina dispersion prepared in 1. above | 6 parts |
| (Silica sol) | |
| Colloidal silica (average particle diameter 100 nm) | 2 parts |
| Methyl ethyl ketone | 1.4 parts |
| (Other components) | |
| Stearic acid | 2 parts |
| Butyl stearate | 6 parts |
| Polyisocyanate (Coronate, Nippon Polyurethane Industry Co., Ltd.) | 2.5 parts |
| (Finishing solvents added) | |
| Cyclohexanone | 200 parts |
| Methyl ethyl ketone | 200 parts |

3. Formula of Nonmagnetic Layer Coating Liquid

| | |
|---|---|
| Nonmagnetic inorganic powder: α-iron oxide | 100 parts |
| Average major axis length: 10 nm | |
| Average acicular ratio: 1.9 | |
| BET specific surface area: 75 $m^2/g$ | |
| Carbon black | 20 parts |
| Average particle diameter 20 nm | |
| $SO_3Na$ group-containing polyurethane resin (molecular weight: 70,000, $SO_3Na$ groups: 0.2 meq/g) | 18 parts |
| Stearic acid | 1 part |
| Cyclohexanone | 300 parts |
| Methyl ethyl ketone | 300 parts |
| 4. Formula of backcoat layer coating liquid | |
| Nonmagnetic inorganic powder: α-iron oxide | 80 parts |
| Average major axis length: 0.15 μm | |
| Average acicular ratio: 7 | |
| BET specific surface area: 52 $m^2/g$ | |
| Carbon black | 20 parts |
| Average particle diameter: 20 nm | |
| Vinyl chloride copolymer | 13 parts |
| Polyurethane resin containing sulfonate groups | 6 parts |
| Phenylphosphonic acid | 3 parts |
| Cyclohexanone | 155 parts |
| Methyl ethyl ketone | 155 parts |
| Stearic acid | 3 parts |
| Butyl stearate | 3 parts |
| Polyisocyanate | 5 parts |
| Cyclohexanone | 200 parts |

5. Preparation of Coating Liquids for Forming Various Layers

The above magnetic liquid was dispersed for 24 hours (bead dispersion) using a batch-type vertical sand mill. The dispersion medium employed was 0.5 mmϕ zirconia beads. The sand mill was used to mix the magnetic liquid and the abrasive liquid that had been prepared with the other components (silica sol, other components, and finishing solvents added). The mixture was dispersed with beads for 5 minutes, and then processed for 0.5 minutes (ultrasonic dispersion) with a batch ultrasonic device (20 kHz, 300 W). Subsequently, a filter having an average pore diameter of 0.5 μm was employed to conduct filtration and a magnetic layer coating liquid was prepared.

For the nonmagnetic layer coating liquid, the various components were dispersed for 24 hours in a batch-type vertical sand mill. The dispersion medium employed was 0.1 mmϕ zirconia beads. The dispersion obtained was filtered with a filter having an average pore diameter of 0.5 μm to prepare the nonmagnetic layer coating liquid.

For the backcoat coating liquid, all of the components other than the lubricants (stearic acid and butyl stearate), polyisocyanate, and 200 parts of the cyclohexanone were kneaded and diluted in an open kneader, and then subjected to 12 passes of dispersion processing, the retention time of each pass being 2 minutes, at a rotor tip peripheral speed of 10 m/s, a bead fill rate of 80%, using 1 mmϕ zirconia beads, in a horizontal bead mill disperser. Subsequently, the remaining components were added to the dispersion and stirred with a dissolver. The dispersion obtained was filtered with a filter having an average pore diameter of 1 μm to prepare a backcoat layer coating liquid.

6. Preparing a Magnetic Tape

On the surface of a polyethylene naphthalate support 5 μm in thickness (Young's modulus in width direction: 8 GPa, Young's modulus in vertical direction: 6 GPa) was coated the nonmagnetic layer coating liquid prepared in 5. above to a thickness upon drying of 100 nm. Following drying, the magnetic layer coating liquid prepared in 5. was coated thereover in a quantity calculated to yield a thickness of 70 nm upon drying. While the magnetic layer coating liquid was still wet, a magnetic field with a field intensity of 0.3 T was applied in a direction perpendicular to the coating surface to conduct vertical-orientation processing, and drying was conducted. Subsequently, the backcoat layer coating liquid prepared in 5. above was applied and dried to a thickness of 0.4 μm on the opposite surface from that of the support.

A calender comprised of just metal rolls was then used to conduct processing to smooth the surface at a temperature of 100° C. and a linear pressure of 300 kg/cm at a rate of 100 m/minute. Subsequently, the product was heat treated for 36 hours in a 70° C. dry environment, and then slit to a width of ½ inch following the heat treatment to obtain a magnetic tape.

Example 2

With the exception that the thickness of the nonmagnetic layer was changed to 300 nm, a magnetic tape was prepared in the same manner as in Example 1.

Example 3

With the exceptions that alumina powder having a $S_{BET}$ of 40 $m^2/g$ was employed in the abrasive liquid, the bead dispersion time following mixing of the magnetic liquid, abrasive liquid, and other components was changed to 30 minutes, and the quantity of carbon black in the nonmagnetic layer coating liquid was changed to 10 parts, a magnetic tape was prepared in the same manner as in Example 1.

Example 4

With the exceptions that alumina powder having a $S_{BET}$ of 40 $m^2/g$ was employed in the abrasive liquid, the bead dispersion time following mixing of the magnetic liquid, abrasive liquid, and other components was changed to 30 minutes, and the quantity of carbon black in the nonmagnetic layer coating liquid was changed to 30 parts, a magnetic tape was prepared in the same manner as in Example 1.

Example 5

With the exception that alumina powder with a $S_{BET}$ of 15 $m^2/g$ was employed in the abrasive liquid, a magnetic table was prepared in the same manner as in Example 1.

Example 6

With the exception that alumina powder with a $S_{BET}$ of 40 $m^2/g$ was employed in the abrasive liquid, a magnetic table was prepared in the same manner as in Example 1.

Example 7

With the exception that the bead dispersion time following mixing of the magnetic liquid, abrasive liquid, and other components was changed to 60 minutes, a magnetic tape was prepared in the same manner as in Example 1.

Example 8

With the exception that ultrasonic dispersion was conducted for 0.5 minute without bead dispersion following mixing of the magnetic liquid, abrasive liquid, and other components, a magnetic tape was prepared in the same manner as in Example 1.

Comparative Example 1

With the exceptions that the bead dispersion time following mixing of the magnetic liquid, abrasive liquid, and other components was changed to 50 minutes and the quantity of carbon black in the nonmagnetic layer coating liquid was changed to 40 parts, a magnetic tape was prepared in the same manner as in Example 1.

Comparative Example 2

With the exceptions that the abrasive liquid was prepared without adding 2,3-dihydroxynaphthalene, the bead dispersion time following mixing of the magnetic liquid, abrasive liquid, and other components was changed to 180 minutes, and the quantity of carbon black in the nonmagnetic layer coating liquid was made 50 parts, a magnetic tape was prepared in the same manner as in Example 1.

Comparative Example 3

With the exception that the thickness of the nonmagnetic layer was changed to 400 nm, a magnetic tape was prepared in the same manner as in Example 1.

Comparative Example 4

With the exception that the thickness of the nonmagnetic layer was changed to 1 μm (1,000 nm), a magnetic tape was prepared in the same manner as in Example 1.

Comparative Example 5

With the exceptions that an alumina powder with a $S_{BET}$ of 10 $m^2/g$ was employed in the abrasive liquid and the bead dispersion time following mixing of the magnetic liquid, abrasive liquid, and other components was changed to 60 minutes, a magnetic tape was prepared in the same manner as in Example 1.

Comparative Example 6

With the exceptions that no 2,3-dihydroxynaphthalene was added, an abrasive liquid was prepared employing an alumina powder with a $S_{BET}$ of 45 $m^2/g$, and the bead dispersion time following mixing of the magnetic liquid, abrasive liquid, and other components was changed to 60 minutes, a magnetic tape was prepared in the same manner as in Example 1.

Comparative Example 7

With the exceptions that alumina powder with a $S_{BET}$ of 20 $m^2/g$ was employed in the abrasive liquid and the bead dispersion time following mixing of the magnetic liquid, abrasive liquid, and other components was changed to 180 minutes, a magnetic tape was prepared in the same manner as in Example 1.

Comparative Example 8

With the exceptions that the abrasive liquid was prepared without adding 2,3-dihydroxynaphthalene and the bead dispersion time following mixing of the magnetic liquid, abrasive liquid, and other components was changed to 60 minutes, a magnetic tape was prepared in the same manner as in Example 1.

Evaluation Methods (1) Surface Abrasive Occupancy on the Magnetic Layer Surface

Secondary electron images were taken at an image pickup magnification of 20,000-fold, at an operating distance of 5 mm, and at an acceleration voltage of 5 kV using a scanning electron microscope (FE-SEM) on the surfaces of the magnetic layers of the Examples and comparative example tapes. The images were rendered binary using WinROOF from Mitani Corp. as an image analyzer, and the ratio of the area occupied by abrasive to the total area was calculated.

(2) SNR

With a reel tester, using a read head (track width 1 μm, gap 200 nm) and a write head (Bs=1.8 T), a signal with a recording density of 250 kfci in the longitudinal direction of the tape was recorded and reproduced. Subsequently, the reproduction signal from the tape and the noise spectrum were measured with a spectral analyzer and the ratio of the reproduction signal to the noise (SNR) was calculated. The SNR obtained by the above method was determined to denote good electromagnetic characteristics when it exceeded 0 dB.

(3) Position Error Signal (PES)

A tape was run with a reel tester and the servo signal from the tape was picked up with a digital storage oscilloscope and analyzed. The amount of vertical motion of the tape that precluded tracking by a magnetic head of LTO G5 specifications was determined. The PES that was measured by the above method was a value affected by running stability and the SNR. The smaller the value, the better the running stability indicated.

(4) Head Abrasion

In an environment of 23° C. and 50% RH, the magnetic tape was run under the conditions indicated below and the abrasion width of a square AlFeSil bar was measured. An abrasion width falling within a range of 20 to 50 μm was determined to indicate the presence on the surface of the magnetic layer of abrasive in a suitable state for ensuring good running stability without substantial abrasion of the head.

(Running Conditions)

The surface of the magnetic layer of the magnetic tape was bought into contact at a lap angle of 12 degrees with one edge of a square AlFeSil bar so as to be perpendicular to the longitudinal direction of the square AlFeSil bar (square bar specified by ECMA-288/Annex H/H2). While in that state, a 580 m length of magnetic tape was run back and forth 50 times at a speed of 3 m/s with a tension of 1.0 N.

(5) Absence or Presence of Abrasive Dropout During Drive Running

Whether or not abrasive dropped out of the magnetic layer surface during drive running was determined by the absence or presence of scratches on the surface of the magnetic layer following drive running (scoring of the magnetic layer surface by abrasive particles that dropped out). In the present evaluation, the magnetic tapes of the Examples and comparative examples were run at 100 ffp in an LTO-G5 drive, after which the absence or presence of scratches on the surface of the magnetic layer was observed at a magnification of 200-fold by a differential interference microscope. Dropout was determined to have occurred on those surfaces that exhibited scratches, and to not have occurred on those that did not.

The evaluation results are given in Table 1.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Thickness of nonmagnetic layer | 100 nm | 300 nm | 100 nm | 100 nm | 100 nm | 100 nm | 100 nm | 100 nm |
| Composite elastic modulus of magnetic layer-side coating layers (GPa) | 7 | 7 | 8 | 6 | 7 | 7 | 7 | 7 |
| $S_{BET}$ of abrasive ($m^2/g$) | 30 | 30 | 40 | 40 | 15 | 40 | 30 | 30 |
| Surface abrasive occupancy (%) | 0.8 | 0.8 | 0.6 | 0.6 | 0.7 | 0.9 | 0.2 | 2 |
| 2,3-dihydroxylnaphthalene in abrasive liquid | Contained | Contained | Contained | Contained | Contained | Contained | Contained | Contained |
| Dispersion period in the preparation of magnetic layer coating liquid | 5 min. with beads and 0.5 min. with ultrasonic | 5 min. with beads and 0.5 min. with ultrasonic | 30 min. with beads and 0.5 min. with ultrasonic | 30 min. with beads and 0.5 min. with ultrasonic | 5 min. with beads and 0.5 min. with ultrasonic | 5 min. with beads and 0.5 min. with ultrasonic | 60 min. with beads and 0.5 min. with ultrasonic | 0.5 min. with ultrasonic |
| Quantity of carbon black in nonmagnetic layer coating liquid | 20 parts | 20 parts | 10 parts | 30 parts | 20 parts | 20 parts | 20 parts | 20 parts |
| Abrasive dropout | Absence | Absence | Absence | Absence | Absence | Absence | Absence | Absence |
| PES | 20 nm | 30 nm | 20 nm | 40 nm | 35 nm | 20 nm | 40 nm | 15 nm |
| SNR | 3 dB | 3.5 dB | 3.5 dB | 3 dB | 3 dB | 3 dB | 4 dB | 3 dB |
| AlFeSil abrasion | 32 μm | 28 μm | 24 μm | 20 μm | 25 μm | 35 μm | 20 μm | 48 μm |
| | **Comp. Ex. 1** | **Comp. Ex. 2** | **Comp. Ex. 3** | **Comp. Ex. 4** | **Comp. Ex. 5** | **Comp. Ex. 6** | **Comp. Ex. 7** | **Comp. Ex. 8** |
| Thickness of nonmagnetic layer | 100 nm | 100 nm | 400 nm | 1 μm | 100 nm | 100 nm | 100 nm | 100 nm |
| Composite elastic modulus of magnetic layer-side coating layers (GPa) | 4 | 3 | 7 | 7 | 7 | 7 | 7 | 7 |
| $S_{BET}$ of abrasive ($m^2/g$) | 30 | 30 | 30 | 30 | 10 | 45 | 20 | 30 |
| Surface abrasive occupancy (%) | 0.3 | 0.3 | 0.8 | 0.8 | 0.3 | 1.5 | 0.1 | 2.2 |
| 2,3-dihydroxylnaphthalene in abrasive liquid | Contained | Not Contained | Contained | Contained | Contained | Not Contained | Contained | Not Contained |
| Dispersion period in the preparation of magnetic layer coating liquid | 50 min. with beads and 0.5 min. with ultrasonic | 180 min. with beads and 0.5 min. with ultrasonic | 5 min. with beads and 0.5 min. with ultrasonic | 5 min. with beads and 0.5 min. with ultrasonic | 60 min. with beads and 0.5 min. with ultrasonic | 60 min. with beads and 0.5 min. with ultrasonic | 180 min. with beads and 0.5 min. with ultrasonic | 80 min. with beads and 0.5 min. with ultrasonic |
| Quantity of carbon black in nonmagnetic layer coating liquid | 40 parts | 50 parts | 20 parts | 20 parts | 20 parts | 20 parts | 20 parts | 20 parts |
| Abrasive dropout | Absence | Absence | Absence | Absence | Absence | Presence | Absence | Presence |
| PES | 120 nm | 150 nm | 100 nm | 140 nm | 100 nm | 80 nm | 140 nm | 70 nm |
| SNR | 2 dB | 2.5 dB | 2.5 dB | 3.5 dB | 3 dB | −2 dB | 2.5 dB | −4 dB |
| AlFeSil abrasion | 15 μm | 10 μm | 12 μm | 18 μm | 16 μm | 58 μm | 17 μm | 64 μm |

Evaluation Results

Based on the results in Table 1, the combination of means (1) to (3) below was confirmed to make it possible to achieve both running stability and electromagnetic characteristics with a thin nonmagnetic layer, and to prevent head abrasion and scoring of the magnetic layer surface by abrasive dropout.

(1) In a magnetic recording medium having a thin nonmagnetic layer of equal to or less than 300 nm in thickness, forming the magnetic layer-side coating layers (including the magnetic layer and nonmagnetic layer) such that the composite elastic modulus falls within a range of 6.0 to 8.0 GPa.

(2) Using a microparticulate abrasive having a specific surface area by BET method that falls within a range of 14 to 40 $m^2/g$ as the magnetic layer abrasive.

(3) Controlling the presence of the above abrasive on the surface of the magnetic layer such that the surface abrasion occupancy on the surface of the magnetic layer falls within a range of 0.2 to 2%.

The magnetic recording medium of an aspect of the present invention is suitable as a high-capacity data backup tape.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a nonmagnetic layer containing a nonmagnetic powder and a binder and a magnetic layer containing a ferromagnetic powder and a binder in this order on a nonmagnetic support, wherein the nonmagnetic layer has a thickness of equal to or less than 300 nm;

a composite elastic modulus as measured on a surface of the magnetic layer ranges from 6.0 to 8.0 GPa;

the magnetic layer comprises an abrasive with a specific surface area by BET method ranging from 14 $m^2/g$ to 40 $m^2/g$; and a surface abrasive occupancy on a surface of the magnetic layer ranges from 0.2% to 0.9%.

2. The magnetic recording medium according to claim 1, wherein the abrasive is alumina.

3. The magnetic recording medium according to claim 2, wherein the magnetic layer further comprises an aromatic hydrocarbon compound having a phenolic hydroxyl group.

4. The magnetic recording medium according to claim 3, wherein the aromatic hydrocarbon compound having a phenolic hydroxyl group is a compound denoted by general formula (1):

(1)

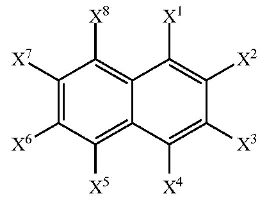

wherein, in general formula (1), two from among $X^1$ to $X^8$ denote hydroxyl groups and each of the remaining portions independently denotes a hydrogen atom or a substituent.

5. The magnetic recording medium according to claim 3, wherein the aromatic hydrocarbon compound having a phenolic hydroxyl group is selected from the group consisting of 2,3-dihydroxylnaphthalene and derivatives thereof.

6. The magnetic recording medium according to claim 1, wherein the magnetic layer further comprises a nonmagnetic particle other than the abrasive.

7. The magnetic recording medium according to claim 1, wherein the magnetic layer further comprises a nonmagnetic particle other than the abrasive, and the nonmagnetic particle is a silica colloidal particle.

8. The magnetic recording medium according to claim 2, wherein the magnetic layer further comprises a nonmagnetic particle other than the abrasive, and the nonmagnetic particle is a silica colloidal particle.

9. The magnetic recording medium according to claim 3, wherein the magnetic layer further comprises a nonmagnetic particle other than the abrasive, and the nonmagnetic particle is a silica colloidal particle.

10. The magnetic recording medium according to claim 4, wherein the magnetic layer further comprises a nonmagnetic particle other than the abrasive, and the nonmagnetic particle is a silica colloidal particle.

11. The magnetic recording medium according to claim 5, wherein the magnetic layer further comprises a nonmagnetic particle other than the abrasive, and the nonmagnetic particle is a silica colloidal particle.

* * * * *